United States Patent Office 3,301,027
Patented Jan. 31, 1967

3,301,027
PULP TREATMENT APPARATUS
John P. Rich, Nashua, N.H., assignor to Improved Machinery Inc., Nashua, N.H., a corporation of Delaware
Filed May 10, 1965, Ser. No. 454,457
4 Claims. (Cl. 68—181)

This invention relates to up-flow reaction towers having primary utility in the treatment of pulp-liquid suspensions and more particularly to chlorination towers of the so-called pump-through type.

One of the essential steps in processing pulp is the chemical bleaching of the pulp. In the past a variety of reaction towers have been designed in which to carry on the bleaching process. One such reaction tower is the so-called pump-through tower, in which a low density suspension of pulp, water and chemical is pumped into the bottom of the tower and continuously removed at the top, the extent of the bleaching being determined by the time of the liquid-suspension within the tower. Such a tower has the advantage of providing a continuous and efficient process.

But pump-through towers have a disadvantage in that all pulp suspensions, regardless of the character of the pulp stock, are treated for identical periods of time, the feed at the base being constant. To remedy this deficiency in the pump-through towers, a plurality of outlets have in the past been provided along the side of such a tower in order that the suspension may be removed at a pre-determined position above the inlet, hence varying the time in which the suspension remains within the tower. Since the next step in the manufacturing process is to wash the pulp suspension, the time of the reaction is also varied by selecting the proper outlet. This arrangement also has disadvantages, however, in that the reaction continues during the time that the suspension is traveling to the washer and as a practical matter, only relatively large increments of time difference may be used to vary the reaction time.

This invention, therefore, has as its primary object to provide means whereby the reaction in such a tower is relatively stopped at the selected outlet removal level within the tower.

A further object of this invention is the provision of means to vary infinitely within maximum and minimum limits the time intervals at which the reaction is stopped.

To accomplish these and other objects of this invention, in a tower of the type described having a plurality of outlets vertically spaced from each other along the side of the tower, a dilution liquid inlet is positioned at the upper portion of the tower above at least all but the uppermost of the outlets, and means are provided within the tower to cause helical movement of the dilution liquid entering through the inlet toward the removal level of the liquid-suspension within the tower. At the removal level an interface is thus established during the operation of the tower between dilution liquid traveling from top to bottom and the liquid-suspension traveling from the base of the tower toward the top. This interface causes a mixing of the dilution liquid and the suspension as the material is removed from the tower, thus relatively stopping the reaction between the suspension and the chemicals at that level. As a refinement of this invention, the outlets within the tower are vertically adjustable in response to external control thus to vary minutely the removal level and hence the reaction time.

These and other features, advantages and objects of this invention will be more clearly understood from the accompanying detailed description thereof, together with the accompanying drawing wherein.

Figure 1:
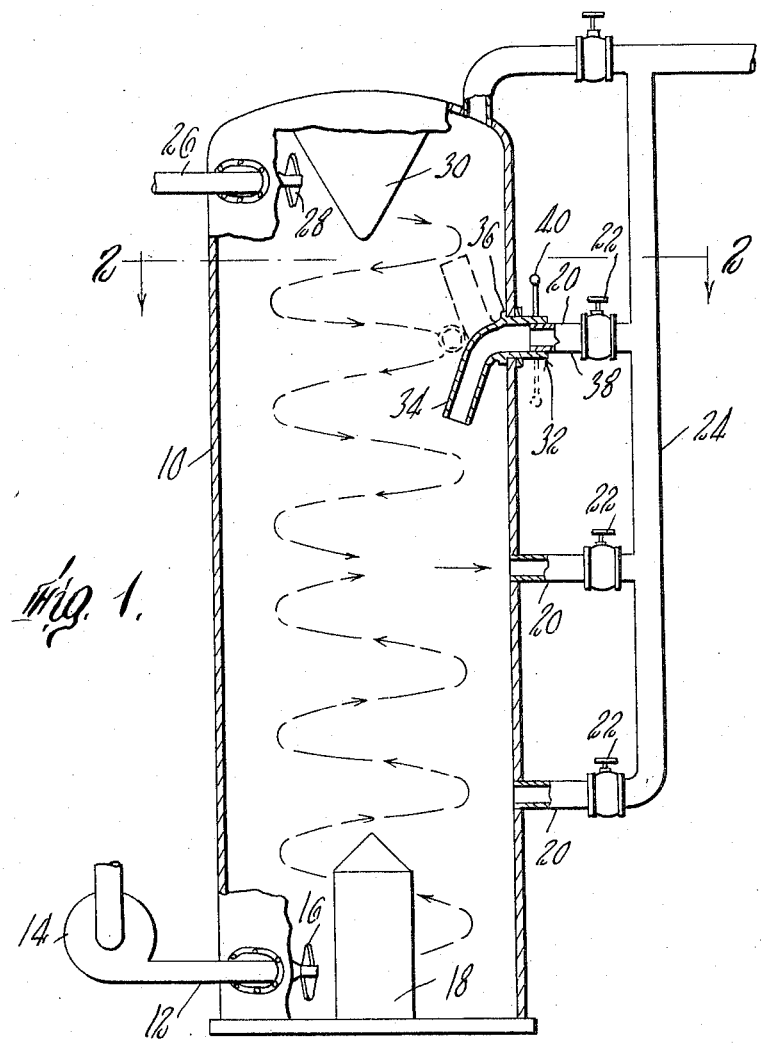
FIG. 1 is a sectional view of a tower embodying the invention.
Figure 2:
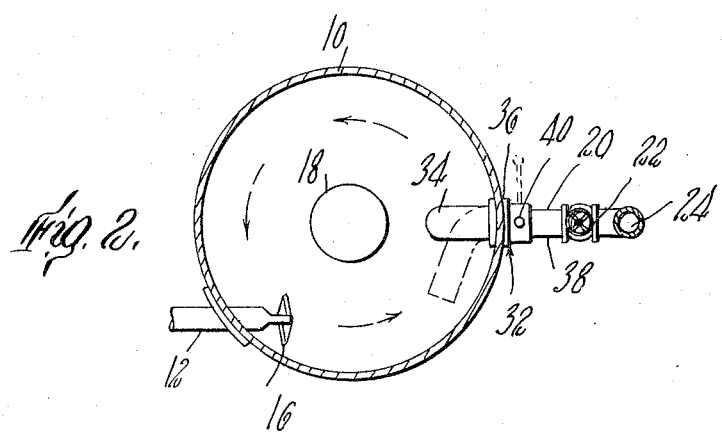
FIG. 2 is a sectional plan view of the tower according to the invention along the line 2—2 of FIG. 1.

Having reference now to FIGS. 1 and 2 of the drawings, it will be seen that a reaction tower 10 comprising essentially a circular chamber with a vertical axis is provided with liquid-suspension inlet means 12 at its lower portion. It is through this tower inlet means 12 that a pulp suspension and chemical are pumped via pump 14 to the interior of the chamber. Impeller means 16 are also provided in the lower portion of the tower to agitate the suspension. In the preferred embodiment of this invention, the inlet 12 is arranged along a chord with respect to the tower, and this tangential arrangement together with the impeller means 16 and a vertical stand 18 positioned at the center of the tower opposite inlet 12 comprises means to cause helical movement of the suspension upward within the tower. Such helical movement is an essential part of the process, as otherwise various portions of the suspension would be treated for different periods of time. Obviously, however, any arrangement of suitable elements may be used to cause this helical movement, such not being limited to the specific arrangement herein set forth.

Spaced above the level of the liquid-suspension inlet 12 and vertically spaced from each other are a plurality of outlet means 20 along the side of the tower. All but the uppermost of these outlets are necessarily provided with valve means 22 for selectively controlling the removal level for the liquid within the tower. Preferably, the uppermost of the outlets 20 is also provided with valve means 22. The outlets preferably lead to a common removal pipe 24 which in turn leads to a pulp washer (not shown).

At the upper portion of the tower, dilution liquid inlet means 26 are also provided. Inlet means 26 are positioned above at least all but the uppermost of the outlet means 20 and may, if desired, also be placed above the uppermost of the outlet means. The inlet means 26 is preferably positioned along a chord with respect to the tower. Impeller means 28 are provided in the upper portion of the tower for agitating the dilution liquid. And a downwardly extending structural member 30 is positioned centrally of said upper portion opposite inlet 26. Together, the impeller means 28, the chordal arrangement of the inlet means 26, and the member 30, provided means for causing helical movement downward of the dilution liquid within the tower.

In order to vary the removal level infinitely between the minimum and maximum levels provided by the uppermost and lowermost outlets, respectively, vertical movement of the outlet means 20 within the tower is provided in a preferred embodiment of this invention. This may comprise any simple arrangement for varying the effective outlet level. One very simple such arrangement is shown at 32 in FIGS. 1 and 2 whereby the outlet means 20 is placed on the end of a rotatable pipe 34 extending horizontally into the tower and then bends at an angle which permits rotation without any striking of the interior wall of the chamber. Any suitable sealing arrangement may be made at the joint 36 between the rotatable pipe 34 and the tower 10 and any suitable means may be provided to join the rotatable pipe 34 with fixed pipe 38 outside the tower. Handle means 40 as shown in FIGS. 1 and 2 may be provided for rotating the pipe 34.

In operation, the time at which it is desired to end the reaction within the tower is first determined and after the determination is made, all of the outlets 20 are closed except the one which will provide suitable time for the reaction to proceed. If the outlets are vertically adjustable, the selected outlet is adjusted in order to achieve a more exact timing of the process. Thereupon, liquid suspension containing chemical is pumped in a helical path (shown by arrows) through the bottom of the tower toward the removal level at the selected outlet. Simultaneously, dilution liquid is fed through inlet 26, also in a helical path (shown by arrows). An interface is thereupon established between the dilution liquid and the suspension at the removal level, and at this interface a mixing which dilutes the suspension and lowers its temperature occurs. The reaction is thereby, relatively speaking, stopped. Should it be desired to change the timing of the reaction, the valve at the proper level may be opened and adjusted and that which is already open may simply be closed without interrupting the material flow within the tower.

Thus, in a very simple fashion this invention provides means for stopping and for infinitely varying, within minimum and maximum limits, the reaction time in a variable retention tower. It will be understood by those skilled in the art that many modifications of this invention are possible without departing from its true spirit and scope, wherefore the description of but a single embodiment of this invention is not to be taken as limiting the scope of the appended claims.

What is claimed is:

1. In a vertically positioned variable retention upflow reaction tower generally of circular cross-section having liquid-suspension inlet means at the lower portion thereof, a plurality of outlet means in said tower vertically spaced from each other above said liquid-suspension inlet means, valve means on at least all but the uppermost of said outlet means for selectively controlling the removal level of said liquid-suspension within said tower, and means within said tower for causing helical movement of said liquid-suspension to said removal liquid, that improvement in which:

dilution liquid inlet means are positioned at the upper portion of said tower, above at least all but the uppermost of said outlet means; and means are provided within said tower for causing helical movement of said dilution liquid to said removal level;

said dilution liquid means establishing in operation, a dilute liquid-suspension substantially at said removal level, and a relative stopping thereat of any proceeding reaction.

2. A variable retention up-flow reaction tower comprising:

a vertically positioned chamber of generally circular cross-section;

liquid-suspension inlet means at the lower portion of said tower;

a plurality of outlet means in said tower vertically spaced from each other above said liquid-suspension inlet means;

valve means on at least all but the uppermost of said outlet means for selectively controlling the removal level of said liquid-suspension within said tower;

dilution liquid inlet means at the upper portion of said tower, located above at least all but the uppermost of said outlet means;

and means within said tower for causing helical movement of said liquids and suspensions to said removal level;

said dilution liquid means establishing, in operation, a dilute liquid-suspension substantially at said removal level, and a relative stopping thereat of any proceeding reaction.

3. The reaction tower claimed in claim 2 wherein at least one of said outlet means is vertically adjustable within said tower for refined selective control of said removal level and wherein means are provided, controllable externally to said tower, for vertically adjusting said adjustable outlet means.

4. A variable retention up-flow reaction tower comprising:

a vertically positioned chamber of generally circular cross-section;

liquid-suspension inlet means at the lower portion of said tower;

a plurality of outlet means in said tower vertically spaced from each other above said liquid-suspension inlet means, at least one of said outlet means being vertically adjustable within said tower;

valve means on each of said outlet means for selectively controlling the removal level of said liquid-suspension within said tower;

means, controllable externally to said tower, for vertically adjusting said adjustable outlet means, and, hence, for refined selective control of said removal level;

dilution liquid inlet means at the upper portion of said tower, located above at least all but the uppermost of said outlet means; and means within said tower for causing helical movement of said liquids and suspensions to said removal level;

said dilution liquid means establishing, in operation, a dilute liquid-suspension substantially at said removal level, and a relative stopping thereat of any proceeding reaction.

References Cited by the Examiner

UNITED STATES PATENTS 2,078,810  4/1937  Richter et al. _____ 680—181
2,267,671  12/1941  Shearer _____ 68—208 X

FOREIGN PATENTS 367,142  3/1963  Switzerland.

IRVING BUNEVICH, *Primary Examiner.*